(12) United States Patent
Ghebremeskel et al.

(10) Patent No.: US 11,098,236 B2
(45) Date of Patent: Aug. 24, 2021

(54) PARTICULATE POLYVINYL ALCOHOL COMPOSITIONS HAVING REDUCED DUST CONTENT

(71) Applicant: KURARAY CO., LTD., Kurashiki (JP)

(72) Inventors: Ghebrehiwet Ghebremeskel, Houston, TX (US); Masaki Kato, Houston, TX (US); Keisuke Morikawa, Houston, TX (US); Erik Bateham, Houston, TX (US)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/554,231

(22) Filed: Aug. 28, 2019

(65) Prior Publication Data

US 2020/0071599 A1    Mar. 5, 2020

Related U.S. Application Data

(60) Provisional application No. 62/776,220, filed on Dec. 6, 2018, provisional application No. 62/723,619, filed on Aug. 28, 2018.

(51) Int. Cl.
| | |
|---|---|
| C09K 8/516 | (2006.01) |
| C08K 3/013 | (2018.01) |
| C08F 16/06 | (2006.01) |
| C08J 3/12 | (2006.01) |
| C08K 3/16 | (2006.01) |
| C08L 3/02 | (2006.01) |
| C08L 29/04 | (2006.01) |
| C08L 31/04 | (2006.01) |
| E21B 33/138 | (2006.01) |
| C08F 28/00 | (2006.01) |
| C08L 1/06 | (2006.01) |
| C09K 8/487 | (2006.01) |
| C08K 3/26 | (2006.01) |
| C08K 3/22 | (2006.01) |
| C09K 8/42 | (2006.01) |
| C09K 8/44 | (2006.01) |

(52) U.S. Cl.
CPC ............. *C09K 8/516* (2013.01); *C08F 16/06* (2013.01); *C08J 3/12* (2013.01); *C08K 3/013* (2018.01); *C08K 3/16* (2013.01); *C08K 3/22* (2013.01); *C08K 3/26* (2013.01); *C08L 3/02* (2013.01); *C08L 29/04* (2013.01); *C08L 31/04* (2013.01); *C09K 8/426* (2013.01); *C09K 8/44* (2013.01); *C09K 8/487* (2013.01); *E21B 33/138* (2013.01); *C08F 2810/00* (2013.01); *C08K 2003/162* (2013.01); *C08K 2003/2296* (2013.01); *C08K 2003/265* (2013.01); *C08K 2201/005* (2013.01); *C08L 2201/06* (2013.01); *C08L 2205/06* (2013.01)

(58) Field of Classification Search
None
See application file for complete search history.

(56) References Cited

U.S. PATENT DOCUMENTS

| | | | |
|---|---|---|---|
| 4,119,604 A | 10/1978 | Wysong | |
| 5,362,778 A * | 11/1994 | Famili | C08L 3/00 |
| | | | 264/185 |
| 8,955,430 B2 | 2/2015 | Leblanc et al. | |
| 9,422,190 B2 * | 8/2016 | Shooshtari | H01M 2/1613 |
| 2012/0272838 A1 | 11/2012 | Leblanc et al. | |
| 2013/0323445 A1 * | 12/2013 | Winget | C08L 71/02 |
| | | | 428/34.5 |
| 2015/0233226 A1 | 8/2015 | Holzhauser et al. | |
| 2016/0122618 A1 | 5/2016 | Nguyen et al. | |
| 2016/0347986 A1 * | 12/2016 | Nguyen | C09K 8/5086 |
| 2017/0166798 A1 | 6/2017 | Okamoto et al. | |
| 2017/0260309 A1 | 9/2017 | Collins et al. | |
| 2019/0023825 A1 | 1/2019 | Collins et al. | |

FOREIGN PATENT DOCUMENTS

| | | |
|---|---|---|
| CN | 107266838 A | 10/2017 |
| CN | 107936431 A | 4/2018 |
| WO | WO 2015/026355 A1 | 2/2015 |
| WO | WO 2019/031613 A1 | 2/2019 |

OTHER PUBLICATIONS

International Search Report and Written Opinion dated Oct. 29, 2019 in PCT/US2019/048610, 16 pages.
International Search Report and Written Opinion dated Oct. 31, 2019 in PCT/US2019/048595, 21 pages.
International Search Report and Written Opinion dated Oct. 25, 2019 in PCT/US2019/048626, 16 pages.
Chikhacheva, I.P., et al., "Polymer-Analog Reactions of Polyvinyl Alcohol under the Action of Microwave Radiation", Russian Journal of General Chemistry, vol. 81 No. 3, 2011, pp. 545-549.
International Search Report and Written Opinion dated Nov. 12, 2019 in PCT/US2019/048641, 16 pages.

* cited by examiner

*Primary Examiner* — Jeffrey D Washville
(74) *Attorney, Agent, or Firm* — Oblon, McClelland, Maier & Neustadt, L.L.P.

(57) ABSTRACT

Provided are low dust-content particulate polyvinyl alcohol-based compositions suitable for a variety of end uses including for use in subterranean treatments and for manufacturing chemical materials, which are prepared by compacting a specified polyvinyl alcohol polymer resins, optionally with specified additives and/or other polyvinyl alcohols.

18 Claims, No Drawings

PARTICULATE POLYVINYL ALCOHOL COMPOSITIONS HAVING REDUCED DUST CONTENT

CROSS-REFERENCE TO RELATED APPLICATIONS

This application claims priority under 35 U.S.C. § 119 from U.S. Provisional Application Ser. No. 62/723,619, filed 28 Aug. 2018, and 62/776,220, filed 6 Dec. 2018, the disclosures of which are incorporated by reference herein for all purposes as if fully set forth.

FIELD OF THE INVENTION

This invention addresses the dust content of particulate, polyvinyl alcohol-based compositions. In particular, this invention relates to particulate compositions manufactured by compacting polyvinyl alcohol polymers and/or copolymers, optionally with one or more specified additives and/or other polymers, wherein the particulate compositions have a desirably low content of fines/dust and, desirably, have a specified particle size distribution and higher bulk density than uncompacted materials.

BACKGROUND OF THE INVENTION

Polyvinyl alcohol is a well-known polymer and is generally commercially available in many forms for a variety of end uses.

Polyvinyl alcohol cannot readily be produced directly from vinyl alcohol. Instead, polyvinyl alcohol is produced on a commercial scale by polymerizing vinyl acetate (with optional comonomers) to generate polyvinyl acetate, after which the acetate groups are hydrolyzed to hydroxyl groups in varying degrees. Several different hydrolysis methods are well known and can be used for this purpose, as discussed in further detail below.

All of these hydrolysis methods tends to result in a particulate polyvinyl alcohol product with a significant amount of dust as a by-product. The dust is a function of the particles size and is formed during the conversion of the polyvinyl acetate to polyvinyl alcohol, as well as, by the mechanical attrition in cutting or pneumatic conveying and in the dryer cyclone, depending on the hydrolysis process used.

The presence of dust is generally undesirable as it constitutes a health risk when inhaled and a safety risk as it is relatively easily ignitable. The patent literature search shows that there are number of ways for controlling the amount of dust in high dusting materials.

For example, EP0691995A1 and publications cited therein disclose a variety of methods and additives used to reduce dust in particulate compositions.

U.S. Pat. No. 4,389,506 discloses a process for producing a reduced dust-free polyvinyl alcohol powder by contacting a polyvinyl alcohol with about 0.5 percent to about 4.0 percent by weight of a water-soluble polyglycol such as a polyethylene glycol.

U.S. Pat. No. 4,542,178 discloses the addition of a plasticizer to a polyvinyl alcohol to form large, agglomerated particles.

It has been found that, while the disclosed processes can help to reduce the dust content to some extent, it is desirable to reduce the dust content even more than obtainable with just a polyglycol or other plasticizer additive.

SUMMARY OF THE INVENTION

In view of this need in the art to obtain and provide improved polyvinyl alcohol compositions, it is proposed herein to provide compacted polyvinyl alcohol compositions, as it has been found that compaction of the particles of a polyvinyl alcohol composition in accordance with this invention is a useful way to control the particle size distribution of a polyvinyl alcohol composition, and to reduce the dust content thereof. As it is believed that the amount of dust, i.e. particles of extremely small size, may be an important aspect of the suitability of a polyvinyl alcohol composition for many uses, it would be technically advantageous to be able to provide polyvinyl alcohol compositions having a desirably low content of fine, extremely small particles, and also having, desirably, a relatively dense particle size distribution.

It is therefore proposed, in one aspect of this invention, to provide a particulate polyvinyl alcohol composition comprising compacted particles of a polyvinyl alcohol composition comprising a polyvinyl alcohol polymer, wherein (i) the polyvinyl alcohol polymer has a viscosity in the range of from about 10 to about 125 mPa·s (as measured in accordance with ASTM-D 1343-56), (ii) the particulate composition has a bulk density in the range of from about 0.30 to about 0.80 g/cm3, and (iii) more than about 99 wt % of the particles have a particle size of 325 mesh or larger.

In a further aspect, this invention provides a particulate polyvinyl alcohol composition that has a content of free dust fines in an amount of less than about 3% (measured as set forth below).

In yet another aspect, this invention provides a process for preparing a particulate composition that comprises particles of a compacted polyvinyl alcohol composition comprising a polyvinyl alcohol polymer, comprising the steps of providing the polyvinyl alcohol composition in the form of a powder, compacting the powder to form an object, granulating the object to form particles, and collecting at least about 99 wt % of the granulated particles that have a particle size of 325 mesh or larger.

The above process directly produces a particulate composition with a very low amount of fines (particle of a size of less than 325 mesh). In one embodiment, the amount of fines produced is less than about 1 wt %, or less than about 0.5 wt %, based on the weight of the polyvinyl alcohol composition. To the extent fines are produced, in an embodiment of the above process, at least a portion of the particles having a particle size of less than 325 mesh are collected and recycled back to the compacting step.

In another embodiment of the above process, the polyvinyl alcohol polymer or the polyvinyl alcohol composition is provided as a slurry in a liquid solvent, and the liquid solvent is removed from the slurry to form the powder.

In another embodiment of the above process, the polyvinyl alcohol polymer is provided in a liquid solvent in a reactor, the polyvinyl alcohol polymer is recovered from the reactor in the form of a deposit in or on a receptacle wherein the deposit forms a body that undergoes gelation and that corresponds substantially to the shape of the receptacle, the body is granulated to form a first batch of particles of the composition, the first batch of particles is sorted according to size to separate therefrom, and collect, at least a portion of particles having a particle size less than 325 mesh, wherein the collected portion forms the powder for the above process.

In one embodiment, the polyvinyl alcohol composition comprises the polyvinyl alcohol polymer and one or more optional additives. Depending on the additive, it can be added before, during or after the compacting step.

In yet another aspect, this invention provides the particulate polyvinyl alcohol composition prepared by or resulting from any one of the processes or methods set forth herein.

The particulate polyvinyl alcohol compositions in accordance with this invention can be utilized, for example, in adhesive compositions, in paper coating compositions, as emulsion stabilizers, in pulp, in subsurface formations and oil & gas operations for reducing fluid loss (such as a diverting agent and/or loss control material), as the base resin for producing other materials such as polyvinyl butyral (PVB), as well as for various glass fiber end uses.

In yet another aspect, this invention provides a method of reducing the loss of one or more desired fluids from a subsurface formation, or from the confines of a wellbore installed within such formation, comprising treating a wall of the formation accessible from the wellbore with a particulate polyvinyl alcohol composition in accordance with the present invention.

The compositions of this invention are particularly suitable for use in subterranean formations where formation temperatures are typically about 200° F. or lower, although, in some cases, these compositions have suitable stability for sufficient time periods to be used at temperatures of up to about 250° F. A particular advantage of the polyvinyl alcohol-based compositions hereof for downhole applications is that they are environmentally friendly as they are temporary, and are considered non-toxic and biodegradable.

In yet another aspect, this invention provides a process for forming a polyacetal comprising reacting with an aldehyde or a ketone a particulate polyvinyl alcohol composition in accordance with the present invention.

In yet another aspect, this invention provides a polyvinyl butyral prepared from a particulate polyvinyl alcohol composition as set forth above and further described below.

The present composition provides a notable benefit in almost all manufacturing operations since the presence of dust is generally undesirable as it constitutes a health risk when inhaled, and a safety risk as it is relatively easily ignited.

These and other embodiments, features and advantages of this invention will be more readily understood by those of ordinary skill in the art from a reading of the following detailed description.

DETAILED DESCRIPTION

This invention relates to particulate polyvinyl alcohol compositions having a reduced dust content and, desirably, a relatively dense particle size distribution. These compositions are manufactured by compacting specified polyvinyl alcohol polymers and/or copolymers, and find substantial use in downhole applications in subterranean treatments, and in various manufacturing operations.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of claim elements is not necessarily limited to only those elements but can include other elements not expressly listed or inherent to such process, method, article, or apparatus.

The transitional phrase "consisting of" excludes any claim element or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified claim elements, materials or steps and those others that do not materially affect the basic and novel characteristic(s) of the claimed invention. A "consisting essentially of" claim thus occupies a middle ground between closed claims that are written in a "consisting of" format, and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion", as used herein, unless otherwise defined herein, means that greater than 50% of the referenced material. If not specified, the percent is on a molar basis when reference is made to a molecule (such as hydrogen, methane, carbon dioxide, carbon monoxide and hydrogen sulfide), and otherwise is on a weight basis (such as for carbon content).

The term "substantial portion" or "substantially", as used herein, unless otherwise defined, means all or almost all or the vast majority, as would be understood by a person of ordinary skill in the relevant art in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising vinyl acetate and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "unit" refers to a unit operation. When more than one "unit" is described as being present, those units are operated in a parallel fashion unless otherwise stated. A single "unit", however, may comprise more than one of the units in series, or in parallel, depending on the context. For example, a thermal treating unit may comprise a first cooling unit followed in series by a second cooling unit.

The term "free-flowing" particles (or agglomerates) as used herein means that the particles do not materially further agglomerate (for example, do not materially further aggregate, cake or clump), as is well understood by those of ordinary skill in the relevant art. Free-flowing particles need not be "dry" but, desirably, the moisture content of the particles is substantially internally contained so that there is minimal (or no) surface moisture.

The term "D(X) particle size" means the diameter at which X % of the sample's mass is comprised of particles with a diameter less than this value. For example, "D(10) particle size" means the diameter at which 10% of the sample's mass is comprised of particles with a diameter less than this value, and "D(90) particle size" means the diameter at which 90% of the sample's mass is comprised of particles with a diameter less than this value.

Mesh sizes of wire screens set forth herein for use in size classification operations are taken from the American Standard Sieve Series (Standard Specification for Woven Wire Test Sieve Cloth and Test Sieves) according to ASTM Standard Ell (2019 version).

The term "substantially soluble in water" and "soluble in water" means substantially completely (or completely) soluble in deionized water under the stated conditions.

The term "substantially soluble in brine" and "soluble in brine" means substantially completely (or completely) soluble in brine (i.e. a water solution with NaCl concentration of up to 2.9 wt %) under the stated conditions.

The term "acid-soluble weighting agent" means a material that is soluble in an acidic medium, or reacts in acidic medium to result in a product that is soluble in water. For example, calcium carbonate reacts in an acidic medium to generate calcium salt that is soluble in water.

For convenience, many elements of this invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Polyvinyl Alcohol Polymers

The resins used in the manufacture of the compositions of this invention are polyvinyl alcohol based. The compositions hereof can contain polyvinyl alcohol homopolymers and/or copolymers, both of which are in a general sense well-known polymers and are generally commercially available in many forms for a variety of end-uses. A typical polyvinyl alcohol suitable for use herein is described in, for example, US2017/0260309A1 and US2019/0055326A1, as well as U.S. Pat. Nos. 2,734,048, 3,497,487, 3,654,247 and 4,119,604.

Polyvinyl alcohol is produced on a commercial scale by polymerizing a vinyl ester (with optional comonomers) to generate a polyvinyl ester, after which the ester groups are hydrolyzed to hydroxyl groups in varying degrees. Examples of vinyl esters suitable for use herein as a starting material include vinyl acetate, vinyl propionate, vinyl stearate, vinyl versatate, vinyl pivalate, vinyl formate, vinyl valerate, vinyl caprinate, vinyl laurate, and vinyl carboxylate copolymers, such as ethylene-vinyl acetate copolymer. For reasons of economy, availability and performance, vinyl acetate is preferred. Several different hydrolysis methods are well-known and can be used for this purpose.

A polyvinyl acetate starting material is thus typically produced by the free radical polymerization of a vinyl acetate monomer in the presence of a polymerization catalyst. The solvent commonly used in the commercial polymerization of vinyl acetate is a hydrolytic alcohol such as methanol, ethanol, the propanols or the monomethyl ether of ethylene glycol. Methanol is preferred. The polymerization is typically conducted in the temperature range of from about 10° C. to about 80° C. The lower end of the polymerization range is known to give products with improved properties. The percent conversion of vinyl acetate to polyvinyl acetate can vary over a wide range. Though conversions ranging from about 20% to 100% have been found satisfactory, commercially at least about 30% conversion is preferable.

Polyvinyl alcohol polymers for use in this invention can include those prepared from polyvinyl acetate copolymers, such as hydrolyzed "acid-functional" polyvinyl acetate copolymers, which can contain one or more "acid-functional" comonomers. The "acid-functional" comonomer is, for example, one or more of (i) a monocarboxylic unsaturated acid, (ii) a dicarboxylic unsaturated acid, (iii) an alkyl ester of (i), (iv) an alkyl ester of (ii), (v) an alkali metal salt of (i), (vi) an alkali metal salt of (ii), (vii) an alkaline earth metal salt of (i), (viii) an alkaline earth metal salt of (ii), (ix) an anhydride of (i), and (x) an anhydride of (ii).

Particular examples of such acid-functional comonomers include methacrylic acid, methyl methacrylate, 2-hydroxyethyl acrylate, hydroxyl methacrylate, ethyl methacrylate, n-butyl methacrylate, maleic acid, monomethyl maleate, dimethyl maleate, maleic anhydride, itaconic acid, monomethyl itaconate, dimethyl itaconate, and itaconic anhydride. Preferred are lower alkyl ($C_2$~$C_8$, or $C_2$~$C_4$) acrylates and methacryles. Non-limiting examples of such comonomers include methyl acrylate, methyl methacrylate, ethyl acrylate, ethyl methyacrylate, propyl acrylate, i-propyl methacrylate, n-propyl acrylate, n-propyl methacrylate, i-butyl acrylate, i-butyl methacrylate, n-butyl acrylate, n-butyl methacrylate, t-butyl acrylate, t-butyl methacrylate, ethylhexyl acrylate, ethylhexyl methacrylate and others. Preferred comonomers also include methyl acrylate, methyl methacylate and mixtures thereof, and particularly methyl acrylate. Examples of commercially available polyvinyl alcohols containing acid-functional comonomers include those available under the trade designation KURARAY POVAL™ K-series grades such as 32-97KL, 25-88KL, 6-77KL and 30-94KL (Kuraray Co., Ltd., Tokyo Japan), or ELVANOL™ 80-18 (Kuraray America, Inc., Houston, Tex. USA).

Other polyvinyl acetate copolymers useful herein to prepare a polyvinyl alcohol composition are those copolymers prepared from a vinyl ester, such as vinyl acetate as discussed above, and an olefinic comonomer. Suitable olefinic comonomers for use herein include without limitation ethylene, propylene, optionally branched $C_4$~$C_{20}$ α-olefins, optionally branched $C_4$~$C_{20}$ internal olefins, optionally branched $C_4$~$C_{20}$ vinylidene olefins, optionally branched $C_4$~$C_{20}$ cyclic olefins and optionally branched $C_4$~$C_{20}$ dienes, as well as optionally branched $C_4$~$C_{20}$ functionalized olefins. Any of the $C_4$~$C_{20}$ compounds listed in the preceding sentence may instead suitably be a $C_4$~$C_{12}$ or a $C_4$~$C_8$ compound. Examples of suitable olefinic monomers include without limitation ethylene, propylene, 1-butene, 1-pentene, 1-hexene, 4-methylpent-1-ene, 1-heptene, 1-hexene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecyl, 1-eicosene, styrene, 2-butene, 4-methyl-1-pentene, ethyl-1-hexene, cyclohexene, norbornene, mixtures thereof and the like. Preferred are ethylene in combination with a $C_3$-$C_8$ α-olefin; more preferred is ethylene. In addition, combinations of an acid-functional comonomer and an olefinic comonomer can also be used.

The comonomer content of a polyvinyl acetate copolymer (and thus the resulting polyvinyl alcohol copolymer) ranges from about 0.1 mol %, or from about 0.5 mol %, or from about 1 mol %, to about 15 mol %, or to about 10 mol %, or to about 8 mol %. In the case of methyl acrylate, the amount is typically about 10 mol % or less, based on the total moles of monomer. In the case of methyl methacrylate, the amount is typically about 5 mol % or less, based on the total moles of monomer. In the case of an olefinic comonomer, the amount could alternatively be about 0.5 mol % to about 6 mol %, or about 0.5 mol % to about 4 mol %, or about 1 mol % to about 3 mol %.

The viscosity-average degree of polymerization of polyvinyl acetate (and resulting polyvinyl alcohol) varies anywhere from about 200, or from about 300, or from about 400, or from about 500, or from about 700, to about 10,000, or to about 3000, or to about 2000. The viscosity-average degree of polymerization of a polyvinyl alcohol polymer is measured in accordance with JIS K6726 (1994), as described above.

Blends with Other High Molecular Weight Homopolymer Polyvinyl Alcohols

In addition to crystallinity modification of a polyvinyl alcohol polymer, another method for controlling the dissolution time of a particulate composition hereof is by blending a first polyvinyl alcohol, such as an acid-functional polyvinyl alcohol copolymer, with one or more second fully- or partially-hydrolyzed polyvinyl alcohols. Such other polyvinyl alcohols may be chosen to be more soluble than the first polyvinyl alcohol polymer, but typically they are chosen to be less soluble and thus extend the dissolution rate of the compositions comprising the combination.

In one embodiment, a polyvinyl alcohol composition hereof comprises a blend, wherein a first polymer, such as a homopolymer or an acid-functional polyvinyl alcohol copolymer, is present in the blend in an amount of from about 10 wt %, or from about 20 wt %, or from about 25 wt %, or from about 33 wt %, or from about 40 wt %, to about 90 wt %, or to about 80 wt %, or to about 77 wt %, or to about 67 wt %, or to about 60 wt %, based on the total weight of all polyvinyl alcohol components. In such embodiment, a second polymer is another polyvinyl alcohol that can, for example, be one or more partially- or fully-hydrolyzed polyvinyl alcohol homopolymers. Such polyvinyl alcohol homopolymers are generally commercially available, for example under the brands KURARAY POVAL™ and ELVANOL™ from Kuraray Co., Ltd. (Tokyo, Japan) and its affiliates, and are present in the blend in an amount that makes up the balance of the composition wherein the content of the first and second polymers totals to 100 wt %.

Transition Grade Blends ("Transition Products")

In another embodiment hereof, a polyvinyl alcohol composition hereof is a transition product produced in a continuous hydrolysis process. Such transition product is in essence an intimate reactor blend of multiple polyvinyl alcohol grades as would be recognized by one of ordinary skill in the relevant art.

For example, in many commercial continuous polyvinyl alcohol hydrolysis processes, instead of completely stopping the process and cleaning the equipment, the polyvinyl acetate feed is transitioned and/or the reaction conditions are transitioned from grade to grade. At some point, the process starts producing one grade of specified properties then transitions over time to a second grade of specified properties. This interim production is referred to as a transition grade.

In one embodiment, this transition grade is produced by transitioning production of a polyvinyl alcohol copolymer to production of a polyvinyl alcohol homopolymer (or vice versa). In this case, the polyvinyl alcohol homopolymer is less soluble than the polyvinyl alcohol copolymer so that the dissolution rate of the particulate composition can be modified.

In another embodiment, the transition grade is produced by altering the hydrolysis conditions, for example, thermal treatment step and/or level of excess catalyst neutralization, which can result in different solubility polyvinyl alcohols from the same starting polyvinyl acetate.

In another embodiment, the transition grade is produced by transitioning both the starting polyvinyl acetate and the hydrolysis conditions (for example, thermal treatment step and/or level of excess catalyst neutralization).

While the exact composition of the transition grade varies as a function of time, when different polyvinyl starting materials are used the average composition should fall within the blend proportions as described above.

Polyvinyl Alcohol Reaction Products

Also included in the polyvinyl alcohol composition to which this invention applies are compositions in which one or more —OH groups on a polymer chain has participated in a reaction to form a derivatized polymer. For example, the —OH groups can form inorganic esters such as when they react with boric acid, borates, lactates, sulfates, vanadyl compounds and/or substituted derivatives thereof, and mixtures of any two or more of the foregoing. Polyvinyl alcohol can also undergo Michaels addition with compounds containing activated double bonds, including for example acrylonitrile, acrylamide and vinyl aldehydes and ketones, including in each case substituted derivatives of, and mixtures of, the named reactants.

In other embodiments, the —OH group of a polyvinyl alcohol can form organic compounds such as the formation of an ester from a carboxylic acid or anhydride (e.g. acrylic or methacrylic acid, or maleic anhydride); the formation of a carbonate from a chloroformate; and the formation of a carbamate from a urea or isocyanate; including in each case substituted derivatives of, and mixtures of, the named reactants. Polyvinyl alcohol can also form an internal ether from the elimination of water, and can form an external ether from a reaction with a $C_2$ or higher, chloro-substituted carboxylic acid or ester thereof, including in each case substituted derivatives of, and mixtures of, the named reactants. Polyvinyl alcohols can also be crosslinked in a reaction with a multifunctional compound such as glyoxal, glutaraldehyde, urea-formaldehyde, melamine-formaldehyde, trimethylolmelamine sodium borate or boric acid, and isocyanates.

Commercially, the most important reaction of the —OH groups of a polyvinyl alcohol is intramolecular (cyclic) or intermolecular (crosslinking) acetalization based on reaction with an aldehyde or ketone. Polyvinyl butyral and polyvinyl formal are produced in commercial quantities from the reaction of polyvinyl alcohol and butyraldehyde and formaldehyde, respectively. The details of processes for making polyvinyl butyral are discussed in U.S. RE 20,430 (20 Jun. 1937).

An alternative embodiment of this invention is consequently a process for the production of a polyacetal that includes providing a particulate polyvinyl alcohol composition as described above, and reacting the polyvinyl alcohol composition with an aldehyde or a ketone, such as an aldehyde $R^2$—C(O)H or a ketone $R^3$—C(O)—$R^4$, wherein $R^2$, $R^3$ and $R^4$ are independently selected from the group consisting of:
  (a) a —CH$_3$, a —C$_2$H$_5$, or a $C_3$ to $C_{25}$ straight-chain, branched or cyclic alkane or alkene moiety, optionally substituted with at least one member selected from the group consisting of Cl, Br, F, I, —OH, —NH$_2$ and —SH;
  (b) a —CH$_3$, a C$_2$H$_5$, or a $C_3$ to $C_{25}$ straight-chain, branched or cyclic alkane or alkene moiety comprising one to three heteroatoms selected from the group consisting of O, N, Si and S, and optionally substituted with at least one member selected from the group consisting of Cl, Br, F, I, —OH, —NH$_2$ and —SH;
  (c) a $C_6$ to $C_{20}$ unsubstituted aryl moiety, or a $C_6$ to $C_{25}$ unsubstituted heteroaryl moiety having one to three heteroatoms independently selected from the group consisting of O, N, Si and S;
  (d) a $C_6$ to $C_{25}$ substituted aryl moiety, or a $C_6$ to $C_{25}$ substituted heteroaryl moiety having one to three heteroatoms independently selected from the group consisting of O, N, Si and S; and wherein said substituted aryl or substituted heteroaryl has one to three substituents independently selected from the group consisting of:
    (i) a —CH$_3$, a —C$_2$H$_5$, or a $C_3$ to $C_{25}$ straight-chain, branched or cyclic alkane or alkene moiety, optionally substituted with at least one member selected from the group consisting of Cl, Br, F, I, —OH, —NH$_2$ and —SH,
    (ii) —OH,
    (iii) —NH$_2$, and
    (iv) —SH; and
  (e) a (CH$_2$)$_n$Si(CH$_2$)$_m$CH$_3$, a —(CH$_2$)$_n$Si(CH$_3$)$_3$, or a —(CH$_2$)$_n$OSi(CH$_3$)$_m$, moiety where n is independently 1-4 and m is independently 0-4.

In yet another embodiment of the above process, the aldehyde is selected from butyraldehyde and formaldehyde.

In yet another embodiment, this invention provides a polyvinyl butyral prepared from a particulate polyvinyl alcohol composition in accordance with the present invention. In yet another embodiment, this invention provides a multi-layer laminate comprising an interior layer prepared from the above-described polyvinyl butyral. In yet another embodiment, the multi-layer laminate comprises a transparent glass device or a photovoltaic module, which is a component of an array that generates electricity from solar radiation.

Polyvinyl Alcohol Production

A polyvinyl ester such as a polyvinyl acetate is converted to polyvinyl alcohol via hydrolysis, or alcoholysis, processes as well known in the art. In such processes, the polyvinyl acetate is contacted with an alkali catalyst such as sodium hydroxide or sodium methylate. The major products of this reaction are polyvinyl alcohol and methyl acetate. Regardless of the hydrolysis process, the resulting polyvinyl alcohols will of course have substantially the same monomer makeup and degree of polymerization as the starting polyvinyl acetates.

One such process is a slurry alcoholysis process in which polyvinyl alcohol is obtained from polyvinyl acetate and recovered as a slurry in a methanol and methyl acetate solvent system. Such process is desirably continuous. The slurry alcoholysis process is well known from a description thereof in previously incorporated US2017/0260309A1, US2019/0055326A1, U.S. Pat. Nos. 2,734,048, 3,497,487 and 3,654,247, and the resulting polyvinyl alcohols are agglomerated particles of a "popcorn" morphology as described below.

In one embodiment of a slurry alcoholysis process, a first solution of typically about 30 wt % to about 60 wt % polyvinyl acetate copolymer in methanol, and a second solution of dilute sodium methylate alcoholysis catalyst in methanol, are continuously fed to an alcoholysis unit wherein the reaction proceeds to produce a first slurry of the alcoholyzed polyvinyl acetate (polyvinyl alcohol) and methyl acetate. Catalyst amount typically ranges from about 0.2 wt % to about 0.5 wt % based on the weight of the reaction mixture. The temperature of the alcoholysis reaction in the alcoholysis unit is typically from about 58° C., or from about 64° C., to about 70° C., or to about 68° C. The pressure within the alcoholysis unit ranges from slightly below atmospheric pressure to slightly above atmospheric pressure, but is typically slightly above atmospheric pressure. The alcoholysis unit contains an agitation means so that the alcoholysis is at least partially conducted under agitation conditions.

When the alcoholysis reaches about 40-50%, the polymer partially precipitates. The insoluble material takes the form of a gel of polymer molecules solvated with methanol. As the solubility decreases by further alcoholysis, the gel becomes tougher and begins to reject the associated solvent molecules. When the alcoholysis is completed, the polymer and solvent are mutually insoluble. If this gel is allowed to stand undisturbed, alcoholysis proceeds and the product is obtained in a massive, unworkable form. However, if the gel is worked mechanically (agitated) during this range above about 40% alcoholysis, the polymer will break down to finely-divided solids insoluble in the alcohol. The collapsing gel traps and sticks together with the fine particles from the previous alcoholysis cycle producing polyvinyl alcohol of a desired "popcorn ball" morphology.

In one embodiment, the alcoholysis unit is made up of a primary alcoholysis vessel where the reaction proceeds to produce a slurry of partially alcoholyzed polyvinyl acetate. The slurry from the primary alcoholysis vessel overflows to an agitated hold vessel which provides additional residence time for completing the alcoholysis reaction. The slurry from the agitated hold vessel is then pumped through one or more finisher units to react short-circuited polyvinyl acetate, thus ensuring that the conversion is raised to 99.5% or higher of desired completion.

Preferred amount of conversion of a polyvinyl acetate starting material is measured as a degree of hydrolysis. The polyvinyl alcohol resin should have a degree of hydrolysis of from about 60 mol %, or from about 65 mol %, or from about 70 mol %, or from about 75 mol %, or from about 85 mol %, or from about 88%, or from about 90 mol %, or from about 93 mol %, or from about 95 mol %, or from about 98 mol %, or from about 99 mol %, to 100 mol % (maximum). In one specific embodiment, the degree of hydrolysis is in the range of from about 60 mol % to 100 mol %. In another specific embodiment, the degree of hydrolysis is in the range of from about 65 mol % to about 90 mol %. The degree of hydrolysis can be measured in accordance with JIS K6726 (1994).

The resulting first polyvinyl alcohol slurry may then optionally be fed to a neutralizing unit along with an acid to fully or partially neutralize remaining alcoholysis catalyst. In one embodiment, the catalyst is substantially neutralized. In another embodiment, less than a predominant portion (less than 50 equivalent %), or less than 25 equivalent %, or less than 10 equivalent %, or less than 5 equivalent %, of any excess alkali catalyst, can be neutralized. Typically, the acid employed is acetic acid. The temperature entering neutralizing unit is slightly lower than in the alcoholysis unit, generally in the range of from about 53° C. to about 60° C., and typically in the range from about 55° C. to about 58° C. Pressure conditions in the neutralizing unit are typically similar to those in the alcoholysis unit.

A second slurry is generated from the neutralizing unit. If present, the neutralizing unit can also be used to control the pH of the resulting second slurry.

In an alternative embodiment, the neutralizing unit is not present (or is bypassed if present, or is present with substantially no acid feed, or is present with no acid feed), and the excess alkali catalyst is substantially not neutralized (or not neutralized) and remains in first slurry.

In yet another embodiment, the second slurry resulting from the neutralization unit, if present, or if not present the first slurry, is then fed to an optional thermal treating unit. The temperature of the first slurry, or the second slurry if present, may be elevated or reduced in the thermal treating unit depending on the desired solubility of the resulting polyvinyl alcohol copolymer. If higher solubility is desired, the temperature can be reduced to less than 50° C., or to less than 40° C., or to less than 35° C., or to less than 30° C., or to less than 25° C., or to less than ambient conditions, with the lower temperatures resulting in higher amorphous and less crystalline content.

The thermal treatment unit can be a holding tank with mild heating, or no heating or even active cooling so that the temperature of the slurry is increased or reduced between entry and exit. In one embodiment, the thermal treating unit is not present.

In one embodiment, the thermally treated slurry, or the second slurry if the thermal treatment unit is not present or not utilized, or the first slurry if the thermal treatment unit and the neutralizing unit are not present or not utilized, is fed to a solids-liquid separation unit where polyvinyl alcohol is separated from the slurry to generate a polyvinyl alcohol wet cake and separated liquids. The solids-liquid separation unit can be a centrifuge and/or filtration device or other conventional solids-liquid separation device.

In an alternate embodiment, the thermal treatment unit and solids-liquid separation unit can be combined in a single unit operation where the residence time of the slurry and solids is sufficient to reduce the temperature of the second slurry to the desired level.

In another embodiment, the process further comprises the step of washing the polyvinyl alcohol wet cake to produce a purified polyvinyl alcohol wet cake, which is then subject to the drying step. The resulting polyvinyl alcohol wet cake can optionally be purified by feeding the wet cake into a washing unit where it is contacted typically with a fresh or recycled methanol stream to remove ash components and other contaminates to generate a purified polyvinyl alcohol wet cake.

In order to generate the final particulate agglomerated polyvinyl alcohol particles, the purified polyvinyl alcohol wet cake after centrifugation, or the wet cake if the washing unit is not present or not utilized, is fed to a drying unit where it is dried via conventional means to remove sufficient remaining liquid content so that the resulting particulate agglomerated polyvinyl alcohol copolymer particles can be recovered, preferably as a free-flowing powder.

Additional process details can be had by reference to previously incorporated US2017/0260309A1, US2019/0055326A1, U.S. Pat. Nos. 2,734,048, 3,497,487 and 3,654,247 and general knowledge of those of ordinary skill in the relevant art.

In the slurry process as described above, dust is produced in the polyvinyl alcohol composition during hydrolysis by the kneader mixer due to the pushing and shearing action from agitation caused by the kneader blades, and dust is also generated by mechanical attrition in pneumatic conveying and in the dryer cyclone. To reduce the dust content resulting from the agitation of the kneader mixer, one embodiment of this invention provides a process for preparing a particulate composition by providing a polyvinyl alcohol as a slurry in a liquid solvent, removing liquid from the slurry to form a powder, compacting the powder to form an object, granulating the object to form particles of the composition in which at least about 99 wt % have a particle size of 325 mesh or larger. In a further step, the granulated particles may be sorted and classified according to size to collect another batch of particles. The object formed from the compacted powder can be described, for example, as a ribbon, sheet, block, chunk, hunk, lump, strand, cable, cylinder, briquette, or other type of three-dimensional shape, mass or workpiece. The step of granulating a compacted powder object may, alternatively in various embodiments, be described as a step of grinding, cutting, cubing, crushing, comminuting, chopping, shredding or pulverizing, and may be performed with a variety of equipment as known in the art and as suitable to a particular situation such as a bead mill, ball mill, jet mill, hammer mill or pin mill. A hammer mill, for example, may have cutting blades with either a knife edge for a cleaner cut or a blunt edge for greater impact and breaking force.

In an alternative embodiment of this invention, however, a polyvinyl alcohol can be prepared by processes other than the slurry method described above, such as a bulk, solution, suspension, dispersion or emulsion process. In other such processes, as known in the art, a polyvinyl alcohol in a gel-like form, which is resistant to dissolving or "sliming" in water, can be prepared by vigorously mixing alcoholic solutions of a polyvinyl ester and alkali in a mixing chamber such as a tank reactor.

Instead of a tank reactor as mentioned above, other types of reactors may also be used when preparing a reaction mixture that is deposited in or on a receptacle, including without limitation a line mixer, a kneader type mixer, a piston-flow type reactor, a tube type reactors, and a tower type reactor. Examples of tower type reactors include packed towers, perforated plate towers, and plate towers, such as bubble-cap towers. Also a heat-exchanging type reactor may be used favorably herein, examples thereof including falling film evaporators, such as plate-fin type evaporators, wetted-wall towers, thin film evaporators, and shell and tube evaporators.

Regardless of the type of device used, the mixing procedure is important in the respect that the mixing time should be so correlated with the balance of the process that sufficient time will remain before the composition fully sets to a rigid gel that it is possible to recover the composition from the reactor and deposit it in the fluid state in or on a receptacle, such as on the surface of a carrier. Generally, the mixing operation can be carried out for from about 0.01 to 0.1 of the total time required for the composition to fully set to a rigid gel for a mixer of the type used, where mixers that have less holdup require correspondingly less mixing and thus less mixing time. The quality of the product may be adversely affected if the gel remains in or on the receptacle overlong and becomes too firm, and an undesirable decrease in solubility in water may occur in the subsequent cutting step due to milling action. If the time allotted for gelation is too short, however, material is obtained that is not sufficiently gelled and that is not as strong or as water resistant, presumably because the molecules are not properly oriented within the gel structure. Consequently appreciable amounts of gel may be lost in the washing step. Gel times of about 3 to about 6 minutes, or about 2 to about 4 minutes are frequently found to be suitable.

After completion of the mixing operation, the reaction mixture is recovered and deposited in such manner as will from a body in or on a receptacle, preferably the surface of a moving carrier such as a moving belt by, for example, pumping from the mixing chamber and coating on the carrier or by gravity flow from the mixing chamber to the carrier. The preferred carrier may be a continuous, recessed moving belt; that is, the belt is supported by a trough flared at both ends and the belt conforms to the contour of the trough. The result is that the mixture deposits in substantial thickness on the belt and as it is carried away from the outlet of the mixing chamber, and it gels in the shape of the receptacle (the trough) such that the deposit forms a body that corresponds substantially to the shape of the receptacle Alternately, the belt can be provided with a series of recesses and provision can be made for ejection of the gel after gelation. In one embodiment, the body undergoing gelation may be formed on a moving belt in the general form of a slab or log. In particular embodiments, such a slab may have a cross section that is actually or approximately rectangular in shape and has a thickness of about 2 to about 6 inches, and a width of about 10 to about 24 inches; and such a log may have a cross section that is actually or approximately circular in shape and has a longest dimension that is about 8 to about 14 inches in length. A suitable belt is canvas coated with polyvinyl alcohol followed by a layer of alcohol-resistant material such as cellulose ester or a resin, especially a vinyl chloride/vinyl acetate copolymer, and the body undergoing gelation rides on such belt as a continuous entity.

The reaction mixture deposited on the carrier forms a body undergoing gelation, and at the point before a significant amount of syneresis has taken place, the body is removed from the belt or other receptacle, and is at once passed into a cutter, or other apparatus for subdividing the gel in any required manner. The point in time at which the gelling body is cut is an important feature since if syneresis is allowed to proceed too far before cutting and the gel becomes appreciably harder thereby, the subsequent cutting operation may have a mechanical working effect the result of which is to raise the minimum solution temperature of the gel in water. Consequently, for maximum quality the body should be removed from the carrier or other receptacle before substantial syneresis has occurred. On the other hand, if the body is cut too soon, when the gel is sticky, the particles will cohere in the cutter. Thus the optimum time for cutting the body is when the gel has undergone no more syneresis than needed to create a rubbery solid that is not sticky and can be cut cleanly. Following cutting, the subdivided gel can be allowed to fully synerese; the supernatant liquid, typically including alcohol and methyl acetate, being withdrawn and the particles of gel are washed until free of salt. The step of cutting a body undergoing gelation may alternatively be described as a step of granulating, cubing, grinding, crushing, comminuting, chopping or pulverizing. Further discussion of processes in which a body undergoing gelation is prepared for wet cutting, as discussed above, may be found in U.S. Pat. Nos. 2,642,419 and 2,643,994.

In a process such as described above wherein gelation forms a rubbery but wet body that is cut, dust can be produced by misoperation of the process in the form of permitting a body to be formed that is too small or thin to yield uniformly large size particles, or allowing the cutter to fill such that the cutter approaches a grinding operation. To reduce the dust content resulting from the misoperation of the cutting step, an alternative embodiment of this invention provides a process for preparing a particulate composition by providing a polyvinyl alcohol in a liquid solvent in a reactor; recovering the polyvinyl alcohol from the reactor in the form of a deposit in or on a receptacle wherein the deposit forms a body undergoing gelation that corresponds substantially to the shape of the receptacle; granulating the body to form a first batch of particles of the composition; sorting the first batch of particles according to size to separate therefrom, and collect, any particles having a particle size less than 140 mesh, the separated and collected particles forming a second batch of particles. Thereafter, the second batch of particles may be compacted to form an object; and the object may be granulated to form a third batch of particles of the composition in which more than about 99 wt % of the particles have a particle size of 325 mesh or larger. As noted above, the first batch of particles can be dried to complete syneresis.

The object formed from the compacted powder can be described, for example, as a ribbon, sheet, block, chunk, hunk, lump, strand, cable, cylinder, briquette, or other type of three-dimensional shape, mass or workpiece. The step of granulating a compacted powder object may, alternatively in various embodiments, be described as a step of grinding, cutting, cubing, crushing, comminuting, chopping, shredding or pulverizing, and may be performed with a variety of equipment as known in the art and as suitable to a particular situation such as a bead mill, ball mill, jet mill, hammer mill or pin mill. A hammer mill, for example, may have cutting blades with either a knife edge for a cleaner cut or a blunt edge for greater impact and breaking force.

Polymeric and Compositional Properties

The percent conversion of vinyl acetate to polyvinyl acetate can vary over a wide range. Though conversions ranging from 20% to 100% have been found satisfactory, commercially at least about a 30% conversion is preferable.

The viscosity-average degree of polymerization of polyvinyl acetate (and resulting polyvinyl alcohol) varies anywhere from about 200, or from about 300, or from about 400, or from about 500, or from about 700, to about 10,000, or to about 3000, or to about 2000. The viscosity-average degree of polymerization of a polyvinyl alcohol copolymer is a value measured in accordance with JIS K6726 (1994), as described above.

Preferred amount of conversion of a polyvinyl acetate starting material is measured as a degree of hydrolysis. The polyvinyl alcohol resin should have a degree of hydrolysis of from about 60 mol %, or from about 65 mol %, or from about 70 mol %, or from about 75 mol %, or from about 85 mol %, or from about 88%, or from about 90 mol %, or from about 93 mol %, or from about 95 mol %, or from about 98 mol %, or from about 99 mol %, to 100 mol % (maximum). In one specific embodiment, the degree of hydrolysis is in the range of from about 60 mol % to 100 mol %. In another specific embodiment, the degree of hydrolysis is in the range of from about 65 mol % to about 90 mol %. The degree of hydrolysis can be measured in accordance with JIS K6726 (1994).

The polyvinyl alcohol compositions hereof are desirably substantially soluble in water and brine at a temperature of 195° F. or higher.

Preferred viscosity, based on a solution of 4 wt % in water (20° C., DIN 53015), is in the range of from about 2 mPa·s, or from about 3 mPa·s, or from about 10 mPa·s, to about 125 mPa·s, or to about 70 mPa·s, or to about 40 mPa·s, or to about 30 mPa·s, or to about 15 mPa·s. The viscosity of all polyvinyl alcohol samples was determined on a 4% aqueous solution at 20° C. determined by the Hoeppler falling ball method (ASTM-D 1343-56).

The particulate compositions of this invention generally have a bulk density of about 0.55 g/cm$^3$ or less, or about 0.50 g/cm$^3$ or less. In other embodiments, however, the compositions hereof have a bulk density of at least about 0.3 g/cm$^3$, at least about 0.4 g/cm$^3$, at least about 0.5 g/cm$^3$, or at least about 0.6 g/cm$^3$, and yet no more than about 0.8 g/cm$^3$, or no more than about 0.6 g/cm$^3$, or no more than about 0.5 g/cm$^3$. Bulk density is measured according to ASTM 1895C-17.

Additives

A composition of this invention may also optionally include one or more additives, which additives may include, for example, fillers (such as acid-soluble weighting agents), plasticizers, starches, slip additives, antioxidants, pigments, dyes, as well as mixtures thereof.

For example, fillers may be blended with the resin component to enhance mechanical properties and regulate the solubility curves of the compositions of this invention. The total amount of filler added (including acid-soluble weighting agent) can vary widely depending on the desired property modification, for example, up to about 50 wt %, or up to about 30 wt %, or up to about 5 wt %, based on the total weight of the compositions.

In many instances where a composition hereof is being used for downhole treatments, it is desirable to have the specific gravity of the composition be close to that of a carrier fluid in order to allow for pumping and satisfactory placement of a diverting agent or loss circulation control compositions using the selected carrier fluid. A weighting agent can be used for such purpose.

When used, an acid-soluble weighting agent filler can be blended with the resin prior to compaction. Weighting agent generally refers to any additive used to increase the density of the resin component. Acid-soluble weighting agents generally include substances such as natural minerals and inorganic and organic salts. For example, the weighting agent can comprise a metal ion selected from the group consisting of calcium, magnesium, silica, barium, copper, zinc, manganese and mixtures thereof, and a counterion is selected from the group consisting of fluoride, chloride, bromide, carbonate, hydroxide, formate, acetate, nitrate, sulfate, phosphate and mixtures thereof.

In another embodiment, the filler added is an acid-soluble weighting agent, which generally include substances such as natural minerals and inorganic and organic salts. Specific examples of such fillers include minerals such as $CaCO_3$, $CaCl_2$ and ZnO.

In yet another embodiment, this invention provides a composition suitable for use in downhole treatments that includes a blend of a polyvinyl alcohol resin component and an acid-soluble weighting agent with a starch. Such blend can typically comprise from about 10 to about 90 parts by weight of the polyvinyl alcohol resin component and from about 90 to about 10 parts by weight of a starch, based on 100 parts by weight of the combination of polyvinyl alcohol resin component and starch. Preferably, however, there should be at least about 30 parts by weight polyvinyl alcohol resin component in any starch blend. Suitable starches for use in the present invention include natural starches, synthetic starches, physically modified starches, chemically modified starches and mixtures thereof.

Plasticizers may be included in manufacturing of the compositions of this invention to improve the flow characteristics of the polyvinyl alcohol. In order to obtain a uniform plasticizer coating it is preferred to utilize a spray mechanism to coat the particles of the polyvinyl alcohol component(s) of the composition. A secondary effect of such plasticizers is to reduce any dusting issues with the polyvinyl alcohol compositions prepared therefrom.

Materials commonly used as plasticizers for polyvinyl alcohols are generally known to those of ordinary skill in the relevant art, and are generally commercially available. Suitable plasticizers include, for example, compounds such as water, glycerol, polyglycerol, ethylene glycol, polyethylene glycols, ethanol acetamide, ethanol formamide, and acetates of triethanolamine, glycerin, trimethylolpropane and neopentyl glycol, and mixtures of two or more of the above. The preferred polyglycol used as an anti-dusting agent in this invention is polyethylene glycol having a molecular weight ($M_n$) of about 200 and 600 due to its superior dust suppressant properties after extreme temperature recycling.

Plasticizers that are solid or crystalline at ambient temperatures, such as trimethylolpropane, may be dissolved in water, or another liquid medium that will not offset the plasticization effect, for use as a sprayable plasticizer. Alternatively, however, a plasticizer can be mixed with the polyvinyl alcohol component(s) of a composition hereof when both are dissolved or dispersed in a liquid, or when both are in dry form. When a plasticizer is mixed with polyvinyl alcohol(s) in liquid, the resulting mixture will have to be dried to form a powder containing plasticized polyvinyl alcohol before other steps are taken, such as compaction of the dried mixture. When a polyvinyl alcohol composition containing a plasticizer is compacted, the plasticizer can be added to the composition before or after the compacting step. When a polyvinyl alcohol composition containing a plasticizer is compacted and the plasticizer is added to the composition after compaction into an object, and after granulation of the object, the plasticizer can be added before or after the step of granulation.

Typically the level of the plasticizer can vary up to about 40 wt %, or up to about 30 wt %, or up to about 20 wt %, based on the weight of the polyvinyl alcohol component(s). In other embodiments, the amount of plasticizer used in the composition can be in the range of about 0.5 wt % to about 15 wt %, 0.5 wt % to about 10 wt %, 0.5 wt % to about 6 wt %, or about 1 wt % to about 4 wt %, based on the total weight of the composition.

In one embodiment, a composition that yields a combination of good solubility properties and density comprises: (a) from about 60 wt % to about 94 wt % polyvinyl alcohol resin component; (b) from about 5 wt % to about 40 wt % acid-soluble weighting agent; and (c) from about 1 wt % to about 15 wt % plasticizer, based on the combined weight of (a), (b) and (c).

One or more other additives can be incorporated into the compositions as necessary when they are used for downhole treatments. The additives include without limitation chelators, anti-oxidants, pH-adjusting agents, oxidizing agents, other lost circulation materials (such as described in the previously incorporated references), scale inhibitors, corrosion inhibitors, clay control additives, iron control additives, reducers, oxygen scavengers and the like. Use of such other additives in subsurface well operations is generally known to those of ordinary skill in the relevant art, as exemplified by many of the previously incorporated references.

Preparation of the Compositions

In one embodiment, the compositions of this invention are prepared by compacting the admixed component(s) thereof under pressure. In certain embodiments where the polyvinyl alcohol (co)polymers are made by the slurry process, it is possible that the material to be compacted will be the entire output of the slurry reactor. In certain other embodiments where the polyvinyl alcohol (co)polymers are made by a process involving formation of a body undergoing gelation, it is possible that the material to be compacted will be only that portion of the particles so produced that are smaller than 325 mesh, or smaller than 200 mesh, or smaller than 140 mesh.

As set forth above, the blend components to be compacted can include one or more polyvinyl alcohol homopolymers and/or copolymers, and one or more additives such as a plasticizer. In an embodiment with both plasticizer and filler, the plasticizer is preferably first added to the polyvinyl alcohol resin component, which is then preferably uniformly blended with one or more of the fillers. The blend is then compacted as described below. In an embodiment with both plasticizer and starch, the plasticizer is again preferably first added to the polyvinyl alcohol resin component, which is then preferably uniformly blended with the starch. The blend is then compacted as described below.

Compaction of a compositional mixture can be carried out using conventional compaction methods and equipment, such as a double roll compactor, which places the component(s) to be compacted under extreme pressure. Where the blended components) adhere to themselves in the compaction process, no additional binder may be needed to agglomerate the mixture into a compacted object. In other words, the various polyvinyl alcohol components hereof may function as their own binder for the agglomerate. Alternatively, however, as discussed above, additives such as fillers, starches and plasticizers may be added to the composition as necessary to enhance the agglomeration of the component(s) thereof. Desirably such compaction and any ensuing granulation, is a dry process that does not require an additional drying step.

The resin compaction can be carried out using conventional compaction methods and equipment, such as a double roll compactor. In a double roll compactor, the mixture is fed between two counter-rotating roll presses. Roll compactors with smooth rolls compact a powdered material into an object such as a sheet with consistent hardness. A roller style press combines torque, via a roll drive system, and thrust, via cylinders in a stressed frame, to agglomerate fines. Agglomeration involves a chemical process, in which two counter-rotating rolls press granular material into larger pieces by pulling or pushing fine material into the nip zone of a dual roll press whereupon the rolls pull the material through the roll nip, and produce dense output. The agglomerated materials put out by a double roll compactor typically form a sheet, ribbon or flakes, have a reduced surface area, and have an increased product bulk density. The rolls apply extreme pressure to press the mixture into a sheet- or ribbon-like form. Desirably, the pressure applied during compaction is at least 5 T, or at least 10 T. After a certain pressure point, the compaction reaches an effective maximum where there is very little increase in density per unit of additional pressure. In one embodiment of the present invention, this effective maximum is about 30 T of pressure. "T" refers to ton (US)/square inch.

Other types of specialized compactors that can be used for compaction of the compositions hereof can also include a briquetter or a single station press. A briquetter converts fine, powdered material into a larger, more convenient size, e.g. briquettes, blocks, chunks, hunks or lumps, to improve handling, transportation, storage or secondary processing of the materials. The material is fed between counter rotating rolls, each of which has half of the desired briquette shape. As the rolls come together, the two halves unite and through extreme pressure, the briquette is formed. Feed material that is high flowing or that consists of fine product distribution is sometimes better compacted by a briquetter because deep briquette pockets increase the nip zone surface area, allowing more material to flow through the press zone. Briquetters in some instances are similar to compactors that produce what are known in the pharmaceutical industry as "slugs", and in other instances consist of a roll compactor with a serrated roll or a smooth roll combined with a granulator/chopper. Briquetters can form discrete shapes such as a cylindrical compact, a pillow, an almond or stick form. If used to compact the compositions hereof, briquetters are typically most useful to make particles at the larger end of whatever size range is desired.

A single station press is a type of powder compacting equipment that uses a single action ram press with a die on both upper and lower punches to form a particle more in the nature of a tablet or pellet. A single station press is available in different types such as cam, toggle/knuckle, and eccentric/rank presses with varying capabilities as may be desired in a particular situation to make particles of a specifically desired size or size range. As with a briquetter, a single station press would be most useful to make particles herein at the larger end of whatever size range is desired.

Once a composition hereof, or a portion of such composition, has been subjected to compaction, especially on a roll mill, the output of the compaction process is passed to a granulator. Where compaction is performed by a roll mill, the granulator is often incorporated directly into the same piece of equipment as the roll mill. The granulator will cut, chop or crush the compacted material to particles of a predetermined size target wherein such particles are random in shape but are desirably reasonably uniform in size and have a relatively narrow size distribution around the target. Settings on the granulator can be adjusted such that the granulator produces particles at a selected size range, such as any of the mesh size ranges set forth below. For example, the granulator can produce a particulate composition in which at least about 99 wt %, or about 99.5 wt %, of the polyvinyl alcohol particles have a particle size of 325 mesh or larger, or other size ranges as listed below. A screening device can further sort the granulated particles according to size, and send any that are smaller than a predetermined lower limit back to the compactor, and send any that are larger than a predetermined upper limit back to the granulator. In cases where it is possible to use a briquetter or single station press to make particles of a composition hereof in a desired size range directly from compaction, it may not be necessary to further process the particles on a granulator.

The step of granulating a compacted powder object may, alternatively in various embodiments, be described as a step of grinding, cutting, cubing, crushing, comminuting, chopping, shredding or pulverizing, and may be performed with a variety of equipment as known in the art and as suitable to a particular situation such as a bead mill, ball mill, jet mill, hammer mill or pin mill. A hammer mill, for example, may have cutting blades with either a knife edge for a cleaner cut or a blunt edge for greater impact and breaking force.

The shape of the particles of the polyvinyl alcohol compositions produced herein can vary in roundness, area, length, width, aspect ratio, and roughness depending on the specific parameters of the compaction and granulation methods applied thereto.

An important step, whether performed before or after a particular batch of particles has been compacted, is to sort a batch or particles according to size to determine the size distribution thereof. A is mechanical shaker used for sieve analysis to perform a size gradation test on a sample of particles. A typical sieve analysis involves a nested column of sieves formed from wire mesh cloth (screen). A representative weighed sample is poured into the top sieve which has the largest screen openings. Each lower sieve in the column has smaller openings than the one above. At the base is a round pan, called the receiver. The column is typically placed in a mechanical shaker. The shaker shakes the column, usually for some fixed amount of time. After the shaking is complete the material on each sieve is weighed. The mass of the sample of each sieve is then divided by the total mass to give a percentage retained on each sieve. Alternatively, each of the progressively finer screens is weighed to determine the tare (unladen) weight, and, after the particles have passed through the column, each screen is weighed together with the collected material, and the tare weight is subtracted, to give the amount of the sample that remains on the screen. In either case, a particle size distribution for the particular polyvinyl alcohol composition source or batch may thus be determined.

In one embodiment of a composition hereof, at least about 99 wt %, or about 99.5 wt %, of the polyvinyl alcohol particles have a particle size of 325 mesh or larger.

In another embodiment of a composition hereof, at least about 98 wt %, or about 98.5 wt %, of the polyvinyl alcohol particles have a particle size of 200 mesh or larger.

In yet another embodiment of a composition hereof, at least about 97 wt %, or about 98 wt %, of the polyvinyl alcohol particles have a particle size of 140 mesh or larger.

In yet another embodiment of a composition hereof, at least about 90 wt %, or about 95 wt %, of the polyvinyl alcohol particles have a particle size of 80 mesh or larger.

In yet another embodiment of a composition hereof, at least about 85 wt %, or about 90 wt %, of the polyvinyl alcohol particles have a particle size of 50 mesh or larger.

In yet another embodiment of a composition hereof, at least about 80 wt %, or about 85 wt %, of the polyvinyl alcohol particles have a particle size of 35 mesh or larger.

In yet another embodiment of a composition hereof, at least about 70 wt %, or about 75 wt %, of the polyvinyl alcohol particles have a particle size of 20 mesh or larger.

In yet another embodiment of a composition hereof, at least about 60 wt %, or about 65 wt %, of the polyvinyl alcohol particles have a particle size of 12 mesh or larger.

In yet another embodiment of a compositions hereof, the particle size distribution of the particles of the composition may be described by a set of values falling within the stated content ranges for a combination of two or more of the mesh size screens as set forth above.

In yet another embodiment of this invention, there is provided a method of adjusting the particle size distribution of a particulate polyvinyl alcohol composition by sorting the particles of the composition according to size, and removing from the composition any particles that are not at least 325 mesh or larger, or are not at least 200 mesh or larger, or are not at least 140 mesh or larger (the "removed fines"), thus leaving a remaining portion of the composition after removal of the removed fines. In a further embodiment of such method, there is provided a step of admixing back with the remaining portion of the composition a specified amount of the removed fines. The specified amount of the removed fines to be readmixed with the remaining portion of the composition can be in the range of more than about 0.5 wt %, or more than about 1 wt %, or more than about 2 wt %, and yet less than about 10 wt %, less than about 6 wt %, or less than about 4 wt % of the weight of the amount of removed fines.

In yet another embodiment of this invention, there is provided a method of adjusting the particle size distribution of a particulate polyvinyl alcohol composition by sorting the particles of the composition according to size, and removing from the composition any particles that are not at least 325 mesh or larger, or are not at least 200 mesh or larger, or are not at least 140 mesh or larger (the "removed fines"), thus leaving a remaining portion of the composition after removal of the removed fines. In a further embodiment of such method, there is provided a step of admixing with the remaining portion of the composition a selected amount of polyvinyl alcohol particles that are at least 80 mesh or larger, and/or are at least 50 mesh or larger, and/or are at least 35 mesh or larger, and/or at least 20 mesh or larger. The selected amounts in which particles that are at least 80 mesh or larger, and/or are at least 50 mesh or larger, and/or are at least 35 mesh or larger, and/or at least 20 mesh or larger may be added to the remaining portion of the composition can be in the range of more than about 1 wt %, or more than about 2 wt %, or more than about 4 wt %, and yet less than about 20 wt %, less than about 12 wt %, or less than about 6 wt % of the weight of the remaining portion of the composition.

In yet another embodiment of this invention, there is provided a method of adjusting the particle size distribution of a particulate polyvinyl alcohol composition by (a) sorting the particles of the composition according to size, and removing from the composition any particles that are not at least 140 mesh or larger, or are not at least 200 mesh or larger, or are not at least 325 mesh or larger (the "removed fines"), thus leaving a remaining portion of the composition after removal of the removed fines; (b) adding back to the remaining portion of the composition an amount (as set forth above) of the removed fines; and (c) adding to the remaining portion of the composition an amount (as set forth above) of particles that are at least 80 mesh or larger, and/or are at least 50 mesh or larger, and/or are at least 35 mesh or larger, and/or at least 20 mesh or larger.

In yet another embodiment, this invention thus provides a method of adjusting the particle size distribution of a particulate polyvinyl alcohol composition by sorting the particles of the composition according to size, and removing from the composition any particles that are not at least 325 mesh size or larger, and then adding to the composition a selected amount of polyvinyl alcohol particles that are not at least 325 mesh size or larger, and/or adding to the composition a selected amount of polyvinyl alcohol particles that are at least 80 mesh size or larger.

In any of the methods as described above, the type and amount of particles to be added is desirably determined in a manner to balance the content of the other size fractions in the composition to give a composition that has a negligible amount of dust but that does not have a disproportionate amount of large particles either, as dictated by the needs of the intended use of the composition. Thus a composition having a relatively dense particle size distribution or gradation may be provided in which most of the particles are in the medium to large size ranges but there are still enough small particles to fill the voids between the larger particles.

In an alternative embodiment of the method set forth above, there may be further provided a step of contacting the polyvinyl alcohol particles of the composition with a plasticizer prior to sorting the particles according to size.

In another embodiment, a composition of this invention may have a content of free dust fines of polyvinyl alcohol polymer in an amount of less than about 3%, or less than about 2.5%, or less than about 2%, or less than about 1.5%, or less than about 1%. Content of free dust fines may be determined quantitatively as the weight percent of free dust fines of a sample of polyvinyl alcohol that could be eluted from the sample with $4.7\times10^{-4}$ m$^3$/s (1.0 cfm) of air in 5 minutes using an open "ACE" B (70~100 micron) porosity fitted funnel as the sample receptacle.

Use of the Compositions

The compositions hereof can be used in fluid injection operations for treatment of subsurface wells and wellbores by processes as generally known in the art, and as exemplified in many of the previously incorporated references. These compositions are particularly suitable for use in subterranean formations where formation temperatures are typically about 200° F. or lower, although in other cases these compositions can also have suitable stability for sufficient time periods at temperatures of up to about 250° F. When a composition hereof is being used for a downhole treatment, the particle size distribution sought to be obtained from the processes and methods of this invention can vary widely depending on the permeability of the substrate, the nature of the carrier fluid, the subsurface temperature profile, the particular polyvinyl alcohol composition being used, and other factors recognized by those of ordinary skill in the relevant art.

This invention therefore further provides a method of reducing the loss of one or more desired fluids from a subsurface formation, or from the confines of a wellbore installed within such formation, comprising treating a wall of the formation accessible from the wellbore with a composition according to this invention. Performing such a method typically involves applying the composition to the wall of the formation to seal an opening therein In other embodiments, the compositions hereof can, as aforesaid, be used to prepare acetals such as polyvinyl butyral, which find substantial use as an interlayer in glazing or glass laminates, or in a photovoltaic assembly.

EXAMPLES

The following examples will facilitate a more complete understanding of this invention, but it is understood that the invention is not limited to the specific embodiments incorporated therein.

Particle size and distribution was measured by "screening" the polyvinyl alcohol resin. A series of progressively finer screens were weighed to determine tare weights. Polyvinyl alcohol resin was then passed through the series of screens. Polyvinyl alcohol granules which did not pass a given screen mesh were weighed, together with the screen, and the tare weight was subtracted, to give the amount of polyvinyl alcohol resin which remained on the screen. Polyvinyl alcohol resin which passed a screen was then screened by the next in the series.

The viscosity of all the polyvinyl alcohol samples was determined on a 4% aqueous solution at 20° C. by the Hoeppler falling ball method.

Comparative Examples 1-9

3 wt % of PEG-600 (a polyethylene glycol having an $M_n$ of about 600, available as CARBOWAX™ 600 polyethylene glycol from The Dow Chemical Company) as a plasticizer was added to nine samples of a commercial-grade polyvinyl alcohol polymer.

CEX 1-2 utilized ELVANOL™ 90-10 and CEX 3-9 utilized ELVANOL™ 71-30 (both products commercially available from Kuraray America, Inc. (Houston, Tex. USA)).

The viscosity, bulk density and particle size distribution is measured for each sample before addition of the plasticizer and again after the two components have been blended by thorough mixing. Table 1 shows the before/after change in viscosity and bulk density for each sample, and Table 2 shows the change in the before/after particle size distribution for each sample. In Table 2, the values of sieve measurements at five different U.S. standard mesh size openings (10, 40, 100, 200 and 325) are shown. The +sign indicates the weight percent of the particles in each sample that are at least the size of a particular mesh opening, and the value shown for "Pan" is the weight percent of the sample that is smaller than 325 mesh size.

Even though the addition of polyethylene glycol did reduce the amount of dust consistent with the description of previously incorporated U.S. Pat. No. 4,389,506, all of CEX 1-9 still produced greater than 1 wt % fines (material passing through 325 mesh size into pan).

Examples 1-7 and 8-11

The base polymer (UC-1) used to prepare the samples in Examples 1-11 was produced by bypassing the neutralization unit in the production process for ELVANOL™ 80-18 resin (Kuraray America, Inc., Houston, Tex. USA) as disclosed in US10125204B2.

Examples 1-7 (Table 3) were produced on a commercial compactor with the mill speed at 75%, pressure 1250 psi, roll speed of 100, mill screen size 0.25, lower rotex screen size of 6 mesh and upper rotex screen size of 8 mesh. Examples 8-11 (Table 4) were produced using with the mill speed at 75%, pressure 1250 psi, roll speed 100, the mill screen size 0.25, the lower rotex screen size was ⅛ inch and the upper rotex screen size was ¼ inch. Duplicate samples were collected for particle size analysis from each bag.

As can be seen from the results, the uncompacted material had a high level of fines/dust, while the compacted materials produced virtually no fines/dust.

TABLE 1

| | Viscosity (inPa · s) | | Bulk Density | |
|---|---|---|---|---|
| | Before adding PEG | After adding PEG | Before adding PEG | After adding PEG |
| CEX 1 | 13.3 | 12.4 | 0.40 | 0.42 |
| CEX 2 | 14.0 | 13.1 | 0.44 | 0.44 |
| CEX 3 | 28.7 | 26.4 | 0.43 | 0.46 |
| CEX 4 | 28.8 | 27.8 | 0.44 | 0.47 |
| CEX 5 | 29.2 | 26.3 | 0.43 | 0.48 |
| CEX 6 | 29.4 | 27.1 | 0.44 | 0.47 |
| CEX 7 | 29.4 | 27.8 | 0.43 | 0.47 |
| CEX 8 | 31.9 | 29.3 | 0.42 | 0.46 |
| CEX 9 | 34.1 | 30.2 | 0.41 | 0.43 |

TABLE 2

| | Particle Size | | | | | | | | | | | |
|---|---|---|---|---|---|---|---|---|---|---|---|---|
| | +10 | | +40 | | +100 | | +200 | | +325 | | Pan | |
| | Before | After | Before | After | Before | After | Before | After | Before | After | Before | After |
| CEX 1 | 0.0 | 0.0 | 8.0 | 7.0 | 54.5 | 57.4 | 28.5 | 28.4 | 5.0 | 4.9 | 4.0 | 2.3 |
| CEX 2 | 0.0 | 0.0 | 2.8 | 2.1 | 61.4 | 54.3 | 28.5 | 37.6 | 5.3 | 3.7 | 2.0 | 2.3 |
| CEX 3 | 0.0 | 0.0 | 3.9 | 4.0 | 57.2 | 56.4 | 28.0 | 32.5 | 6.8 | 6.5 | 6.8 | 6.5 |
| CEX 4 | 0.0 | 0.0 | 3.3 | 2.2 | 53.9 | 53.0 | 33.4 | 36.8 | 6.0 | 6.0 | 3.4 | 2.0 |
| CEX 5 | 0.0 | 0.0 | 2.8 | 2.2 | 55.0 | 55.2 | 32.7 | 32.6 | 5.6 | 6.6 | 3.9 | 1.4 |
| CEX 6 | 0.0 | 0.0 | 4.3 | 3.1 | 49.2 | 45.7 | 33.7 | 38.2 | 9.0 | 10..0 | 3.0 | 1.7 |
| CEX 7 | 0.0 | 0.0 | 4.3 | 3.1 | 49.2 | 45.7 | 33.7 | 38.2 | 9.0 | 10.0 | 3.0 | 1.7 |
| CEX 8 | 0.0 | 0.0 | 3.1 | 2.3 | 48.0 | 47.4 | 36.1 | 43.2 | 6.8 | 6.5 | 6.0 | 6.5 |
| CEX 9 | 0.0 | 0.0 | 2.8 | 2.0 | 42.6 | 46.0 | 38.4 | 40.0 | 9.1 | 2.5 | 7.1 | 9.5 |

TABLE 3

| PRODUCT | TOTAL WEIGHT | MESH SIZE | | | | | |
|---|---|---|---|---|---|---|---|
| | | 10 | 60 | 80 | 200 | 325 | PAN |
| UC-1 | 100.1 | 0.1 | 24.6 | 20.7 | 44.5 | 5.5 | 4.7 |
| EX 1 | 98.3 | 35.0 | 62.5 | 0.3 | 0.4 | 0.1 | 0.0 |
| EX 2 | 104.9 | 38.2 | 65.7 | 0.3 | 0.5 | 0.1 | 0.1 |
| EX 3 | 102.5 | 26.8 | 73.7 | 0.6 | 0.8 | 0.4 | 0.2 |
| EX 4 | 103.3 | 20.9 | 80.5 | 0.6 | 0.8 | 0.3 | 0.2 |
| EX 5 | 103.8 | 44.3 | 58.4 | 0.3 | 0.5 | 0.1 | 0.2 |
| EX 6 | 101.4 | 37.5 | 62.8 | 0.3 | 0.5 | 0.2 | 0.1 |
| EX 7 | 102.6 | 44.1 | 57.4 | 0.3 | 0.5 | 0.2 | 0.1 |

TABLE 4

| PRODUCT | TOTAL WEIGHT (g) | MESH SIZE | | | | | |
|---|---|---|---|---|---|---|---|
| | | 10 | 60 | 80 | 200 | 325 | PAN |
| UC-1 | 100.1 | 0.1 | 24.6 | 20.7 | 44.5 | 5.5 | 4.7 |
| EX 8 | 104.9 | 100.8 | 2.1 | 0.5 | 1.0 | 0.3 | 0.2 |
| EX 9 | 104.6 | 100.5 | 2.2 | 0.5 | 0.9 | 0.3 | 0.2 |
| EX 10 | 103.8 | 101.7 | 1.3 | 0.3 | 0.4 | 0.1 | 0.0 |
| EX 11 | 104.6 | 101.2 | 2.5 | 0.3 | 0.4 | 0.2 | 0.0 |

What is claimed is:

1. A particulate polyvinyl alcohol composition, comprising: particles of a polyvinyl alcohol composition comprising a polyvinyl alcohol polymer;
   wherein
   (i) the polyvinyl alcohol composition particles are compacted under a pressure of at least 5 ton/square inch,
   (ii) the polyvinyl alcohol polymer has a viscosity in the range of from about 10 to about 125 mPa·s,
   (iii) the particulate composition has a bulk density in the range of from about 0.30 g/cm$^3$ to about 0.80 g/cm$^3$, and
   (iv) more than about 99 wt % of the particles have a particle size of 325 mesh or larger.

2. The composition of claim 1, wherein which content of free dust fines of polyvinyl alcohol polymer is less than about 3%.

3. The composition of claim 1, wherein the polyvinyl alcohol polymer comprises a polyvinyl alcohol homopolymer.

4. The composition of claim 1, wherein the polyvinyl alcohol polymer comprises a copolymer prepared from a vinyl ester monomer and a monomer selected from the group consisting of an unsaturated acid or a derivative thereof, an olefinic monomer, and mixtures thereof.

5. The composition of claim 1, further comprising a second polyvinyl alcohol polymer selected from the group consisting of a (a) polyvinyl alcohol homopolymer, and (b) a copolymer prepared from a vinyl ester monomer and a monomer selected from the group consisting of an unsaturated acid or a derivative thereof, an olefinic monomer, and mixtures thereof.

6. The composition of claim 1, wherein the polyvinyl alcohol polymer is a transition product.

7. The composition of claim 1, further comprising a plasticizer selected from the group consisting of water, glycerol, polyglycerol, ethylene glycol, polyethylene glycols, ethanol, acetamide, ethanol formamide, and acetates of triethanolamine, glycerin, trimethylolpropane and neopenty glycol, and mixtures of two or more of the foregoing.

8. The composition of claim 1, further comprising a polyethylene glycol having a molecular weight (M) in the range of from about 200 to about 600, in an amount of form about 0.5 wt % to about 6 wt % based upon the weight of the polyvinyl alcohol polymer.

9. A process for preparing a particulate composition, comprising:
particles of a compacted polyvinyl alcohol composition comprising a polyvinyl alcohol polymer,
the process comprising:
providing the polyvinyl alcohol composition in the form of a powder,
compacting the powder under a pressure of at least 5 ton/square inch to form an object,
granulating the object to form particles, and
collecting at least about 99 wt % of the granulated particles that have a particle size of 325 mesh or larger,
wherein (i) the polyvinyl alcohol polymer has a viscosity in the range of from about 10 to about 125 mPa·s, and (ii) the particulate composition has a bulk density in the range of from about 0.30 to about 0.80 g/cm$^3$.

10. The process of claim 9, wherein less than 1 wt % of particles having a particle size of less than 325 mesh are produced.

11. The process of claim 9, wherein at least a portion of the particles having a particle size of less than 325 mesh are collected and recycled back to the compacting operation.

12. The process of claim 9, wherein the polyvinyl alcohol polymer or the polyvinyl alcohol composition is provided as a slurry in a liquid solvent, and the liquid solvent is removed from the slurry to form the powder.

13. The process of claim 9, wherein the polyvinyl alcohol polymer is provided in a liquid solvent in a reactor, the polyvinyl alcohol polymer is recovered from the reactor in the form of a deposit in or on a receptacle wherein the deposit forms a body that undergoes gelation and that corresponds substantially to the shape of the receptacle, the body is granulated to form a first batch of particles, the first batch of particles is sorted according to size to separate therefrom, and collect, at least a portion of particles having a particle size less than 325 mesh, wherein the collected portion forms the powder.

14. The process of claim 9, further comprising contacting the powder with a plasticizer before and/or after the compaction.

15. A process for forming a polyacetal, comprising: reacting the particulate polyvinyl alcohol composition of claim 1 with an aldehyde $R^2$—C(O)H or a ketone $R^3$—C(O)—$R^4$, wherein $R^2$, $R^3$ and $R^4$ are independently selected from the group consisting of:
(a) a —CH$_3$, a —C$_2$H$_5$, or a C$_3$ to C$_{25}$ straight-chain, branched or cyclic alkane or alkene moiety, optionally substituted with at least one member selected from the group consisting of Cl, Br, F, I, —OH, —NH$_2$ and —SH;
(b) a —CH$_3$, a —C$_2$H$_5$, or a C$_3$ to C$_{25}$ straight-chain, branched or cyclic alkane or alkene moiety comprising one to three heteroatoms selected from the group consisting of O, N, Si and S, and optionally substituted with at least one member selected from the group consisting of Cl, Br, F, I, —OH, —NH$_2$ and —SH;
(c) a C$_6$ to C$_{20}$ unsubstituted aryl moiety, or a C$_6$ to C$_{25}$ unsubstituted heteroaryl moiety having one to three heteroatoms independently selected from the group consisting of O, N, Si and S,
(d) a C$_6$ to C$_{25}$ substituted aryl moiety, or a C$_6$ to C$_{25}$ substituted heteroaryl moiety having one to three heteroatoms independently selected from the group consisting of O, N, Si and S; and wherein said substituted aryl or substituted heteroaryl has one to three substituents independently selected from the group consisting of:
(i) a —CH$_3$, a —C$_2$H$_5$, or a C$_3$ to C$_{25}$ straight-chain, branched or cyclic alkane or alkene moiety, optionally substituted with at least one member selected from the group consisting of Cl, Br, F, I, —OH, —NH$_2$ and —SH,
(ii) —OH,
(iii) —NH$_2$, and
(iv) —SH; and
(e) a —(CH$_2$)$_n$Si(CH$_2$)$_m$CH$_3$, a —(CH$_2$)$_n$Si(CH$_3$)$_3$, or a —(CH$_2$)$_n$OSi(CH$_3$)$_m$, moiety where n is independently 1-4 and in is independently 0-4.

16. The process of claim 15, wherein the aldehyde comprises butyraldehyde or formaldehyde.

17. A method of reducing the loss of one or more desired fluids from a subsurface formation, or from the confines of a wellbore installed within such formation, comprising treating a wall of the formation accessible from the wellbore with the particulate polyvinyl alcohol composition of claim 1.

18. The method of claim 17, which comprises applying the composition to the wall of the formation to seal an opening therein.

* * * * *